(12) United States Patent
Westfall et al.

(10) Patent No.: US 11,318,857 B2
(45) Date of Patent: May 3, 2022

(54) SYSTEM FOR HANDS-FREE ELECTRIFIED VEHICLE CHARGING

(71) Applicant: FORD GLOBAL TECHNOLOGIES, LLC, Dearborn, MI (US)

(72) Inventors: Christopher Westfall, San Francisco, CA (US); Hannah Bailey, Dearborn, MI (US); Jacob Mathews, Superior Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 16/671,264

(22) Filed: Nov. 1, 2019

(65) Prior Publication Data

US 2021/0129696 A1   May 6, 2021

(51) Int. Cl.
| | |
|---|---|
| *B60L 53/35* | (2019.01) |
| *H01R 13/639* | (2006.01) |
| *H01R 13/631* | (2006.01) |
| *H01R 13/62* | (2006.01) |
| *H01R 13/60* | (2006.01) |
| *H02J 7/00* | (2006.01) |
| *B60L 53/16* | (2019.01) |
| *B60L 53/18* | (2019.01) |
| *B60L 53/66* | (2019.01) |
| *B60K 6/28* | (2007.10) |

(52) U.S. Cl.
CPC ............... *B60L 53/35* (2019.02); *B60L 53/16* (2019.02); *B60L 53/18* (2019.02); *B60L 53/66* (2019.02); *H01R 13/60* (2013.01); *H01R 13/6205* (2013.01); *H01R 13/631* (2013.01); *H01R 13/639* (2013.01); *H02J 7/0045* (2013.01); *H02J 7/0047* (2013.01); *B60K 6/28* (2013.01); *B60Y 2200/92* (2013.01); *B60Y 2300/91* (2013.01)

(58) Field of Classification Search
CPC .......... B60L 53/16; B60L 53/35; B60L 53/18; B60L 53/66; H01R 13/60; H01R 13/6205; H01R 13/631; H01R 13/639; H02J 7/0045; B60Y 2300/91
See application file for complete search history.

(56) References Cited

U.S. PATENT DOCUMENTS

| | | | |
|---|---|---|---|
| 9,428,070 B2 | 8/2016 | Bell et al. | |
| 2011/0148350 A1* | 6/2011 | Wegener | H02J 7/025 320/108 |
| 2012/0286730 A1 | 11/2012 | Bonny | |

(Continued)

FOREIGN PATENT DOCUMENTS

WO   WO-2013073049 A1 *   5/2013   ............. E05B 65/00

OTHER PUBLICATIONS

Machine translation of WO-2013073049-A1 (Year: 2021).*

*Primary Examiner* — David V Henze-Gongola
(74) *Attorney, Agent, or Firm* — David B. Kelley; Brooks Kushman P.C.

(57) ABSTRACT

A vehicle charging station includes a shroud configured to guide a vehicle charge plug that is lowered from a vehicle toward a charge connector as the vehicle moves toward the charging station. The vehicle charge plug and the charge connector have contacts arranged on a connector face that is generally perpendicular to a surface on which the vehicle charging station rests.

11 Claims, 7 Drawing Sheets

(56) References Cited

U.S. PATENT DOCUMENTS

| | | | |
|---|---|---|---|
| 2013/0049687 A1* | 2/2013 | Hershey | H02J 7/0042 |
| | | | 320/109 |
| 2016/0049819 A1* | 2/2016 | Butler | H02J 7/0068 |
| | | | 320/105 |
| 2018/0345804 A1* | 12/2018 | Nagel | B60L 53/16 |

* cited by examiner

SYSTEM FOR HANDS-FREE ELECTRIFIED VEHICLE CHARGING

TECHNICAL FIELD

This application generally relates to automated hands-free charging for an electrified vehicle.

BACKGROUND

Electrified vehicles include a traction battery that may be recharged by connecting to an external charger. The electrified vehicle includes a charge port or plug for receiving a charge connector from the external charger. For convenience of the human operator, the charge port is located on a body panel. Charging systems typically rely on manual coupling of the charge connector to a vehicle charge plug to initiate charging. As a result, charging systems are generally designed to facilitate the manual coupling by the vehicle operator.

SUMMARY

A vehicle charging system includes a charge connector coupled to a power supply and having contacts arranged on a face that is oriented generally perpendicular to a surface on which the vehicle charging system rests. The vehicle charging system includes a shroud coupled to the charge connector and defining a channel leading from the charge connector to a pair of angled surfaces that are configured to guide an element of a charge plug that is lowered from a vehicle and moving toward the charge connector into the channel. The vehicle charging system includes a locking pin coupled to an actuator and configured to selectively extend into the channel and limit movement of the charge plug.

The actuator may be a solenoid. The shroud may be further configured with an upper surface that is shaped to slope away from the channel and the charge connector to direct liquid away from the channel. The charge connector may further include one or more magnetic elements to attract the charge plug. The shroud may include integrated supports configured to support the shroud on the surface and defines open sides to prevent debris accumulation under the shroud. The vehicle charging system may further include flexible feet coupled to the shroud and configured to support the shroud on the surface. The vehicle charging system may further include a heating element coupled to the shroud and configured to prevent accumulation of ice proximate the charge connector. The vehicle charging system may further include a charge status indicator that is coupled to a charge cable coupled to the charge connector and configured to convey status of the vehicle charging system. The charge status indicator may further include a plurality of light elements for conveying a state of charge of a vehicle battery during charging. The charge status indicator may further include a display element configured to display a time to full charge. The charge status indicator may include a multicolor lighting element to convey the status.

A vehicle includes a charge plug having contacts arranged on a face that is oriented generally perpendicular to a surface on which the vehicle travels and a cable coupled to the charge plug. The vehicle includes a cable spool configured to selectively wind and unwind the cable on the cable spool to raise and lower the charge plug. The vehicle includes an actuator coupled to the cable spool and configured to rotate the cable spool. The vehicle includes a connector retention frame configured to receive the charge plug when retracted and through which the cable passes and including a cover portion for the contacts and an angled surface to guide the charge plug as the charge plug is retracted.

The charge plug may further include a locking mechanism configured to engage a loop that extends from a charge station connector into the face of the charge plug when actuated. The actuator may be an electric motor. The charge plug may further include one or more magnetic elements configured to attract the charge plug to a charge station connector. The vehicle may further include an alignment pulley configured to direct the cable through connector retention frame and route the cable to the cable spool.

A method for coupling a charge plug of a vehicle to a charge connector of a ground-based charge station includes guiding an element coupled to a charge plug that is lowered from a vehicle toward a channel as the vehicle moves toward the charge station, wherein the channel guides the charge plug to the charge connector. The method includes attracting the charge plug to the charge connector using a magnetic force. The method includes engaging a lock mechanism to prevent movement of the charge plug. The method includes transferring power between the charge connector and the charge plug to charge a battery of the vehicle.

The method may further include establishing wireless communication between a vehicle controller and a charge station controller. The method may further include disabling propulsion of the vehicle during charging. The method may further include limiting forward motion of the vehicle using one or more wheel stops.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
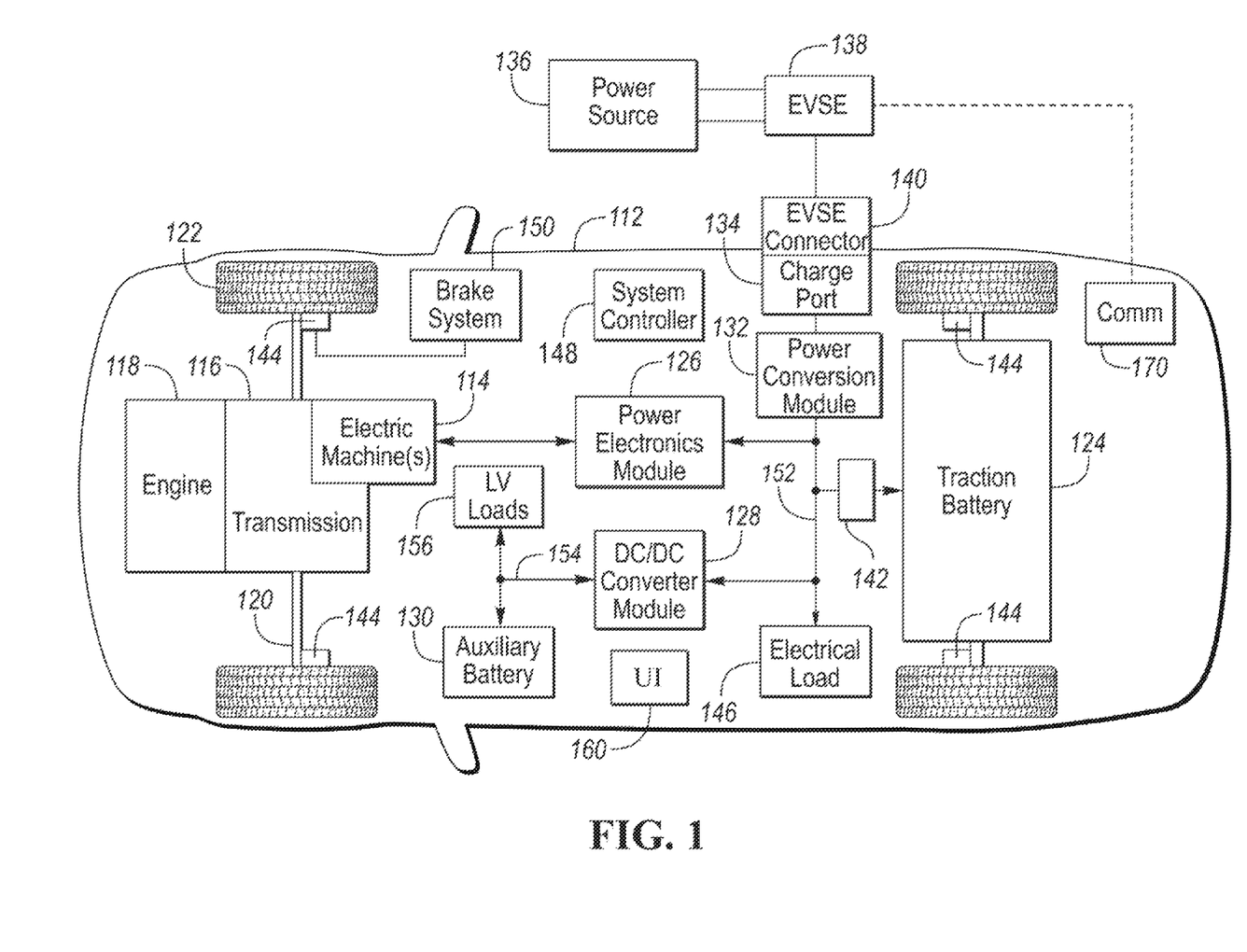
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and regenerative braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the electrified vehicle 112 to be operated in electric mode with the engine 118 off under certain conditions. An electrified vehicle 112 may also be a battery electric vehicle (BEV). In a BEV configuration, the engine 118 may not be present.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124.

One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DDC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger. The charger 132 may condition the power supplied from the EVSE 138 to provide the proper voltage and current levels to the traction battery 124 and the high-voltage bus 152. The charger 132 may be electrically coupled to the contactor module 142. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for slowing the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for slowing the vehicle. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 112. A vehicle system controller (VSC) 148 may be present to coordinate the operation of the various components.

The vehicle 112 may include a wireless communication module 170 that is configured to implement wireless communications. The wireless communication module 170 may include an antenna and interface circuitry to implement one or more wireless communication standards. For example, the wireless communication module 170 may support wireless Ethernet (e.g., IEEE 802.11) and Bluetooth communication interfaces. The wireless communication module 170 may be used to establish a wireless communication channel with the EVSE 138 to facilitate charging.

The electrified vehicle 112 may further include a user interface 160. The user interface 160 may provide a variety of display elements for communicating information to the operator. The user interface 160 may provide a variety of input elements for receiving information from the operator. The user interface 160 may include one or more displays. The displays may be touch-screen displays. The user interface 160 may include discrete lamps/lights. For example, the lamps may include light-emitting diodes (LED). The user interface 160 may include switches, rotary knobs, and buttons for allowing the operator to change various settings. The user interface 160 may include a control module that communicates via the vehicle network. The user interface 160 may provide one or more display elements that are indicative of charging being inhibited and vehicle operation being inhibited. The user interface 160 may also provide display elements for indicating a status of the contactor module 142. The display elements may include discrete lamps and/or messages in a message display area. The user interface 160 may also include a diagnostic terminal that permits access to stored controller data using a diagnostic tool or other device. For example, the diagnostic terminal may allow the user or technician to retrieve diagnostic codes that are stored in the vehicle controllers.

To improve the user experience with electrified vehicles, the vehicle charging system may incorporate hands-free charging. Present vehicle charging systems require the user to manually position the charge connector to the vehicle charge port. An improved system may permit automatic alignment of the charge station and vehicle charging elements.

Some charging system have adapted a wireless or inductive charging strategy. Such systems inductively transfer power by aligning transmit and receive coils. While wireless charging systems may be effective, such systems have not seen widespread adoption. In addition, the wireless systems require infrastructure updates from the present conductive charging systems. A consideration in any vehicle charging system is cost. Existing strategies for hands-free conductive charging include a variety of actuators and sensors to properly align the charge components of the vehicle and the charging station. These sensors and actuators increase the cost the such systems. A simpler, less expensive hands-free conductive charging system may be more likely to gain widespread adoption.

The vehicle charging system disclosed herein can provide effective hands-free conductive charging without complicated alignment features. The vehicle charging system disclosed herein can use forward motion of the vehicle in combination with magnetic elements, gravity, and springs to align and connect the charging elements. A simple charge station ground unit is disclosed that is cost effective and can be deployed in large numbers. The charging system uses conductive contacts that are horizontally oriented (e.g., parallel to ground surface).

The vehicle charging system disclosed can operate with or without a moveable cover on the ground unit or the vehicle. Gravity can be used to lower a weighted charge connector from the vehicle. A protective shroud on the ground unit also acts as a cable guide to provide macro positioning. Magnetic elements near the contact elements provide fine alignment to mate the connectors and provide a force to secure the connection. The system may also incorporate a spring-loaded mechanism to retract the charge cable. The ground unit may include a locking mechanism to secure the charge connection during charging.

Figure 2:
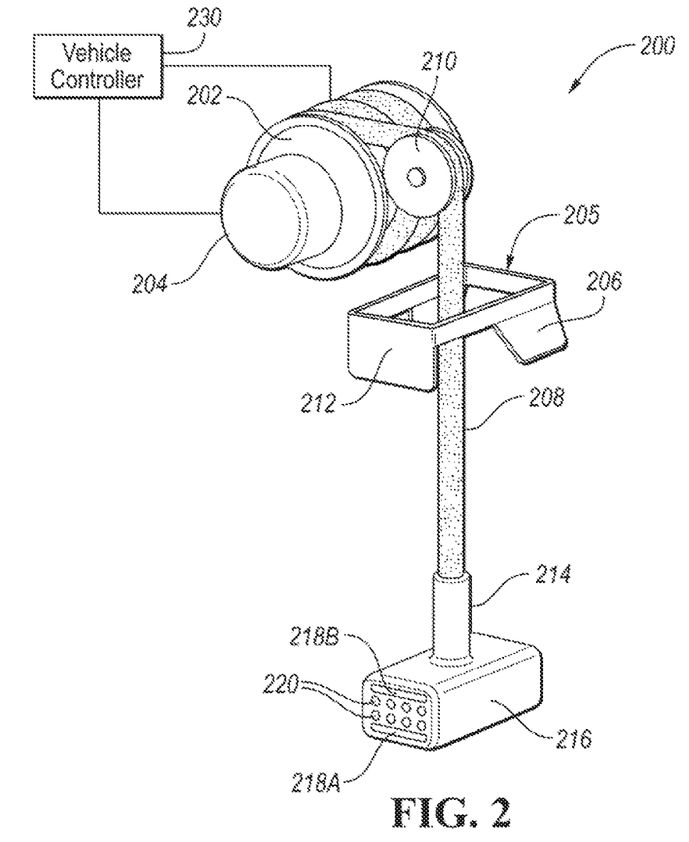
FIG. 2 depicts a possible configuration for a vehicle charge connector.

FIG. 2 depicts a possible vehicle charge connection system 200 for facilitating hands-free vehicle charging. The vehicle charge connection system 200 includes components for lowering a charge connector beneath the vehicle for mating with a ground-based charger.

The vehicle charge connection system 200 may include a cable spool 202. The cable spool 202 may be configured to coil and uncoil a charge cable 208. The charge cable 208 may include conductors for transferring power and signals. For example, the charge cable 208 may include power conductors that are coupled to the power conversion module 132. The charge cable 208 may include conductors for transferring signals during charging (e.g., Society of Automotive Engineers J1772 standard interface). The signal conductors may be electrically coupled to a vehicle controller 230 within the vehicle for processing. The vehicle controller 230 may include a processing unit and volatile and non-volatile memory. The vehicle controller 230 may include circuitry for interfacing to the various components. The vehicle controller 230 may be programmed to implement the various features described herein. The vehicle controller 230 may be connected to the vehicle network and may interface with the wireless communication module 170 to communicate over a wireless communication channel.

The cable spool 202 may be driven by an electric motor 204. A shaft of the electric motor 204 may be coupled to the cable spool 202. The shaft may be aligned with a central axis about which the cable spool 202 is configured to rotate. In other configurations, the shaft may be coupled to an input shaft of a gearbox having an output shaft that is coupled to cable spool 202. The electric motor 204 may be driven by the vehicle controller 230. The cable spool 202 may also be a spring-loaded device such that a spring biases the spool to a retracted position.

The vehicle charge connection system 200 may further include a vehicle charge plug or connector 216. The vehicle charge connector 216 may include one or more electrical contacts 220. The electrical contacts 220 may be electrically coupled to corresponding conductors of the charge cable 208. The vehicle charge connector 216 may be coupled to the charge cable 208. The vehicle charge connector 216 may include a cable protector element 214 that is configured to surround the charge cable 208 in a region proximate the vehicle charge connector 216. The cable protector element 214 may be formed of the same material as the vehicle charge connector 216. The cable protector element 214 may be a hollow cylinder or pin that is coupled to the vehicle charge connector 216 that allows the charge cable 208 to pass through. The one or more electrical contacts 220 may be arranged on a face of the vehicle charge connector 216. The face may be oriented generally perpendicular to a surface on which the vehicle travels. That is, the contacts 220 may be arranged on a vertical plane parallel to the ground surface.

The vehicle charge connector 216 may include one or more weight elements (not shown). The vehicle charge connector 216 may be designed with a predetermined weight to prevent excess movement when deployed. The weight may also be achieved by material selected for a housing of the vehicle charge connector 216. For example, a thickness of the housing may be selected to achieve the predetermined weight.

The vehicle charge connection system 200 may further include a connector retention frame 205. The connector retention frame 205 may be configured to retain the vehicle charge connector 216 in a retracted position. The connector retention frame 205 may include a connector guide element 206. The connector guide element 206 may be configured to receive the vehicle charge connector 216 when in a retracted positions. The connector retention frame 205 may include a contact cover 212 that is configured to shield the contacts 220 when in the retracted position. The contact cover 212 may include a gasket or other sealing element. The orientation of the face of the vehicle charge connector 216 and the contact cover 212 protect the electrical contacts 220 from exposure to contaminants. The connector retention frame 205 may be configured to define an opening through which the charge cable 208 may be raised and lowered. The connector guide element 206 may include one or more angled or flared surfaces to aid in guiding the vehicle charge connector 216 into the retracted position. For example, as the vehicle charge connector 216 is raised, it may contact the connector guide element 206 which directs the vehicle charge connector 216 toward the opening of the connector retention frame 205. This allows the vehicle charge connector 216 to be properly seated in the connector retention frame 205 in the presence of lateral and longitudinal displacement of the vehicle charge connector 216 during retraction.

The vehicle charge connection system 200 may further include an alignment pulley 210. The alignment pulley 210 may be configured to position the cable 208 over the opening of the connector retention frame 205. The alignment pulley 210 may be configured to route the cable 208 to the cable spool 202. The alignment pulley 210 may be coupled to a common frame with the cable spool 202 or the connector retention frame 205. The alignment pulley 210 may be configured to rotate about an axis as the charge cable 208 travels in a circumferential channel defined by the alignment pulley 210. The placement of the alignment pulley 210 allows for different mounting and packaging configurations.

The vehicle charge connector 216 may include one or more magnetic elements 218 that are aligned on the face of the vehicle charge connector 216. The magnetic elements 218 may be configured to provide a magnetic force for aligning and securing the connection to the ground-based charger during charging. The magnetic elements 218 may be permanent magnets. In some configurations, the magnetic elements 218 may be electromagnets driven by the vehicle controller 230.

During a drive cycle (e.g., not charging), the vehicle charge connector 216 may be in a retracted mode in which the vehicle charge connector 216 is seated in and retained by the connector retention frame 205. In the retracted mode, the contact cover 212 shields the electrical contacts 220 from debris and contaminants. When the vehicle approaches a charge station the vehicle charge connector 216 may be lowered from the connector retention frame 205.

Figure 3:
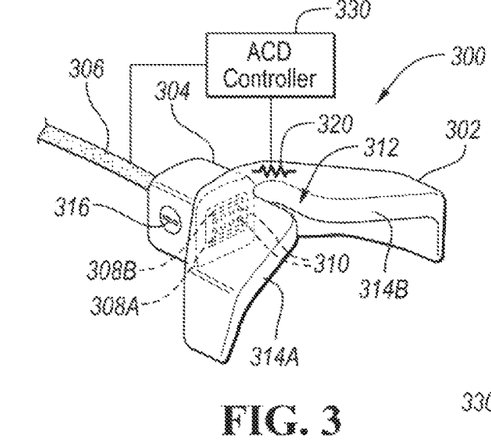
FIG. 3 depicts a possible configuration for a ground-based automated charging device.

FIG. 3 depicts a possible configuration for an Automated Charging Device (ACD) 300. The ACD 300 may include an ACD charge plug or connector 304. The ACD charge connector 304 may be coupled to a power source via a cable 306. The ACD charge connector 304 may define a plurality of electrical contacts 310 arranged on a face that is oriented generally perpendicular to a surface (e.g., ground) on which the ACD 300 rests. The face may be a generally vertical plane. The ACD charge connector 304 may include one or more magnetic elements 308 that are configured to attract and retain the vehicle charge connector 216. The magnetic elements 308 may be permanent magnets and/or may be electromagnets driven by an ACD controller 330. The magnetic elements 308 may be aligned to match the arrangement of the vehicle magnetic elements 218. The magnetic elements 308 may be polarized to complement the vehicle magnetic elements 218 such that the vehicle magnetic elements 218 and the ACD magnetic elements 308 are attracted to one another. The ACD 300 may include a cable access cap 316. The cable access cap 316 may permit entry into the ACD charge connector 304 for examining connections. The cable access cap 316 may be a sealing element to prevent moisture from entering the ACD charge connector 304.

The cable 306 may include conductors associated with each of the contacts 310. For example, the conductors may supply power and ground to corresponding contacts 310 in the ACD charge connector 304. The conductors may transfer various signals between the ACD controller 330 and the vehicle controller 230. The cable 306 may be coupled to the EVSE 138. The contacts 310 may be arranged to match the electrical contacts 220 of the vehicle charge connection system 200.

The ACD controller 330 may include a processing unit and volatile and non-volatile memory. The ACD controller 330 may include circuitry for interfacing to the various components. The ACD controller 330 may be programmed to implement the various features described herein. The ACD controller 330 may include a wireless communication transceiver for communicating over a wireless communication channel. The ACD controller 330 may be configured to operate one or more ACD ground stations. In some configurations, the ACD controller 330 may be housed as part of the EVSE 138.

The ACD 300 may further include a canopy or shroud 302. The shroud 302 may be coupled at a first end to the ACD charge connector 304. The shroud 302 may be configured to cover the contacts 310 of the ACD charge connector 304 to prevent water or debris coming in contact with the contacts 310. The shroud 302 may be constructed of plastic or other material. The shroud 302 may define a channel 312 that leads toward the ACD charge connector 304. The shroud 302 may further define a pair of angled surfaces 314 on a surface opposite or away from the first end at which the ACD charge connector 304 is coupled. The angled surface 314 may be configured to guide a cable (e.g., 208) lowered from a vehicle toward the channel 312. The angled surfaces 314 may define a general V-shape such that a cable moving toward the ACD charge connector 304 is directed toward the channel 312. The angled surfaces 314 allows for a degree of misalignment of the vehicle charge connector 216 during docking. That is, the vehicle charge connector 216 does not have to be perfectly aligned with the ACD charge connector 304 during docking.

The ACD 300 may include a heating element 320 that is configured to heat an area proximate the ACD charge connector 304. The location of the heating element 320 may be selected to prevent accumulation of ice proximate the ACD charge connector 304. The heating element 320 may be electrically coupled to the ACD controller 330. The ACD controller 330 may be programmed to activate the heating element 320 responsive to temperatures being less than a predetermined temperature (e.g., temperature at which water freezes). The ACD controller 330 may activate the heating element 320 periodically between charge cycles during low temperature conditions to prevent water from freezing proximate the ACD charge connector 304. The ACD controller 330 may include or interface to a temperature sensor configured to measure a temperature of ACD 300.

The shroud 302 may include integrated supports for raising the shroud 302 above ground level. For example, the supports may be molded as part of the shroud 302. The shroud 302 may be constructed to have open sides so that debris does not accumulate under the shroud 302. The open sides may permit debris to continue through rather than accumulate underneath the shroud 302. An upper surface of the shroud 302 may be configured to slope away the channel 312 to direct liquid to drain from the upper surface away from the channel 312.

Figure 4:
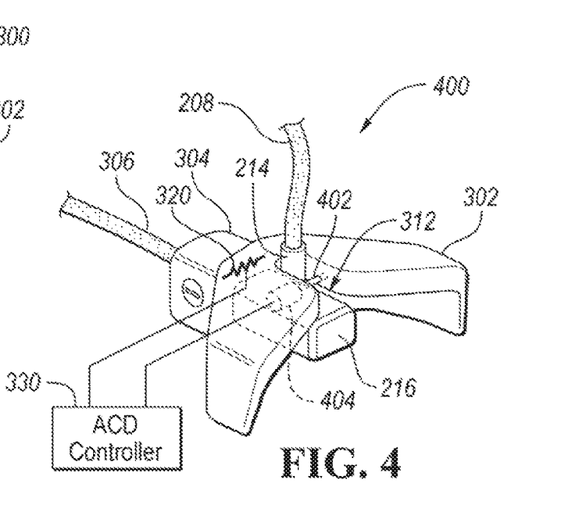
FIG. 4 depicts a possible configuration for a ground-based automated charging device with a vehicle charge connector connected.

FIG. 4 depicts another possible configuration of an ACD 400 that depicts a vehicle charge connector 216 being received by an ACD 400. The features of the ACD 400 include the previously discussed features. The vehicle charge connector 216 is aligned with the ACD charge connector 304. In the position depicted, the cable protector element 214 coupled to the vehicle charge connector 216 is received by the channel 312.

The ACD 400 may include a locking pin 402 and an associated actuator 404 that are coupled to the shroud 302. The locking pin 402 may be configured to be positioned by operation of the actuator 404. For example, the locking pin 402 may be a piston driven by the actuator 404 which is a solenoid. The shroud 302 may define an opening through which the locking pin 402 may pass through. In a locked state, the locking pin 402 may extend across the channel 312 such that movement of the cable protector element 214 through the channel 312 is limited or blocked. In an unlocked state, the locking pin 402 may be retracted from the channel 312 such that the entry into and exit from the channel 312 of the cable protector element 214 are not limited. The actuator 404 may be electrically coupled to the ACD controller 330 that is programmed to operate the actuator 404.

Figure 5:
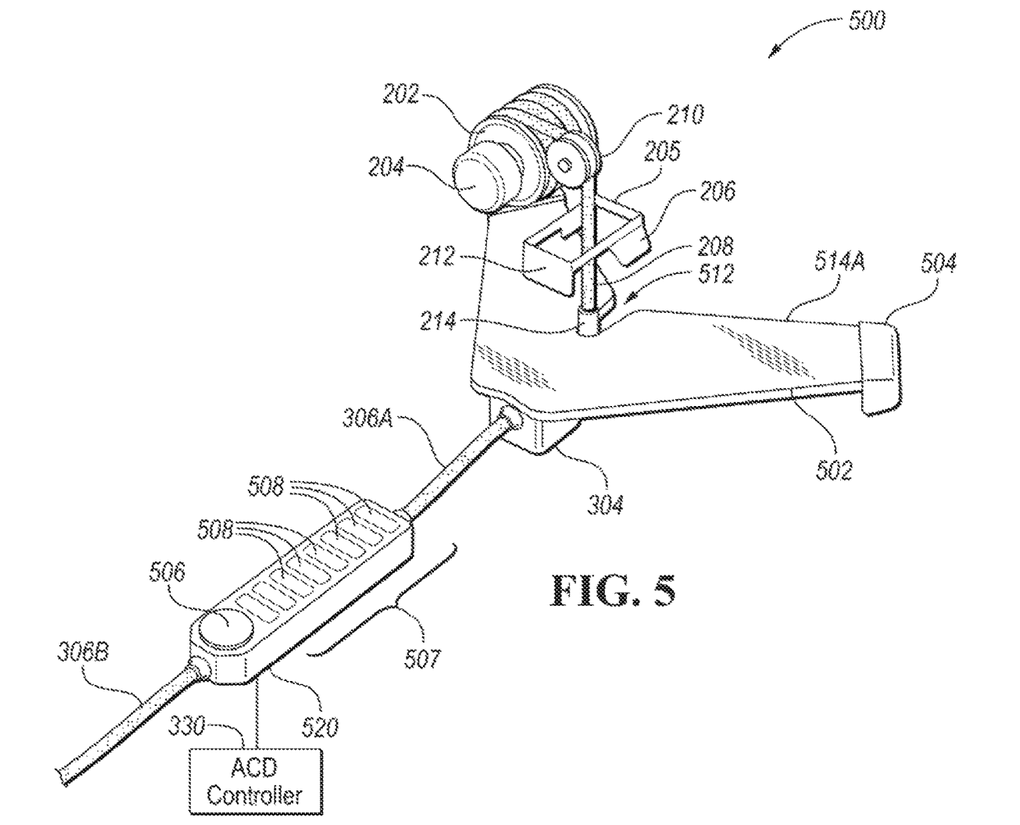
FIG. 5 depicts a possible configuration for a ground-based automated charging device with retractable vehicle charge connector connected.

FIG. 5 depicts another possible configuration of an ACD 500 that depicts the vehicle and charge station components. Note that features having the same label as previously described may operate in the manner as previously described. The ACD 500 may include a canopy 502 that generally functions as previously described herein. The ACD 500 may include one or more flexible supports 504 coupled to the canopy 502. The flexible supports 504 may be configured to support one or more portions of the canopy 502. The flexible supports 504 may be constructed of a pliable material that returns to its original shape after deformation. The flexible supports 504 help to prevent the ACD 500 from being permanently deformed in the event of being driven over or stepped on. Application of a downward force on the canopy 502 results in deformation of the flexible supports 504. After removal of the downward force, the flexible supports 504 return to their original shape.

The canopy 502 may define a channel 512 that is configured to receive the cable protector element 214 and/or vehicle cable 208. The canopy 502 may be coupled to the ACD charge connector 304 at a first end. The canopy 502 may define one or more angled surfaces 514 on a surface at a distance from the first end. The angled surfaces 514 may perform as described previously herein to guide the vehicle charge connector 216 to the channel 512. The channel 512 may lead from the ACD charge connector 304 to a pair of angled surfaces 514.

The ACD 500 may further include a charge system indicator 520. The charge system indicator 520 may be electrically coupled in-line with the cable 306. The charge system indicator 520 may be operated and controlled by the ACD controller 330. The charge system indicator 520 may be configured to provide charge status information regarding the charging operation of a connected vehicle. The charge system indicator 520 may include a charging status indicator 506. The charging status indicator 506 may be a light element such as a light emitting diode (LED). The charging status indicator 506 may include different color light elements to depict various charging statuses. For example, the charging status indicator 506 may be used to indicate the availability of the ACD 500. The charging status indicator 506 may be used to indicate when the ACD 500 is charging a vehicle. The charging status indicator 506 may be used to indicate that the ACD 500 is not available for charging (e.g., power source not available). The different status indications may be expressed as a different color light, by flashing the charging status indicator 506 at different rates, and/or some combination thereof. The charging status indicator 506 may be a multicolored lighting element. The charging status indicator 506 may be raised from a housing of the charging system indicator 520 such that the charging status indicator 506 is readily visible.

The charging status indicator 506 may be implemented as a display element such as a liquid crystal display (LCD). In such configurations, additional information may be conveyed. For example, the charging status indicator 506 may display a time remaining until a full charge is achieved. In other configurations, the charging status indicator 506 may display a numerical state of charge value for the traction battery 124.

The charge system indicator 520 may further include a light bar 507 that may be comprised of a plurality of light elements 508. The light elements 508 may include lamps or LEDs. The light bar 507 may also be a display such as a liquid crystal display (LCD). The light bar 507 may be configured to display a relative value of a charging parameter. The light bar 507 may be configured to display discrete levels of the parameter. For example, when no light elements 508 are activated, the parameter value may be zero or zero percent. When all light elements 508 are activated, the parameter value may be one hundred percent or a maximum value. The light bar 507 may be further configured to flash the light elements 508 in a predetermined sequence or pattern to indicate various conditions.

In some configurations, the charging parameter may include a state of charge of the traction battery 124 being charged. The light bar 507 may be configured to convey the state of charge of the traction battery of the charging vehicle. For example, illumination of all of the light elements 508 may indicate a full state of charge. The state of charge level may be indicated by the number of light elements 508 that are illuminated. For example, more light elements 508 may be illuminated as the state of charge increases. One or more light elements 508 may be flashed to indicate other conditions related to the charging operation. The state of charge may be received from the vehicle controller 230 which may be programmed to periodically transmit the state of charge or provide the state of charge upon request.

The charge system indicator 520 may also include a display element such as a liquid crystal display (LCD). The display element may be used to display the charging status and state of charge using graphical or numeric elements.

The charge system indicator 520 may be positioned along the charge cable 306 at a distance from the ACD charge connector 304 such that the charge system indicator 520 is visible to a driver of the vehicle and/or a person proximate the vehicle. For example, the charge system indicator 520 may be positioned so that it is not underneath the vehicle when the vehicle is charging. In some configurations, the charge system indicator 520 may be mounted on a post and vertically displaced from the ground or resting surface of the ACD charge connector 304.

Figure 9:
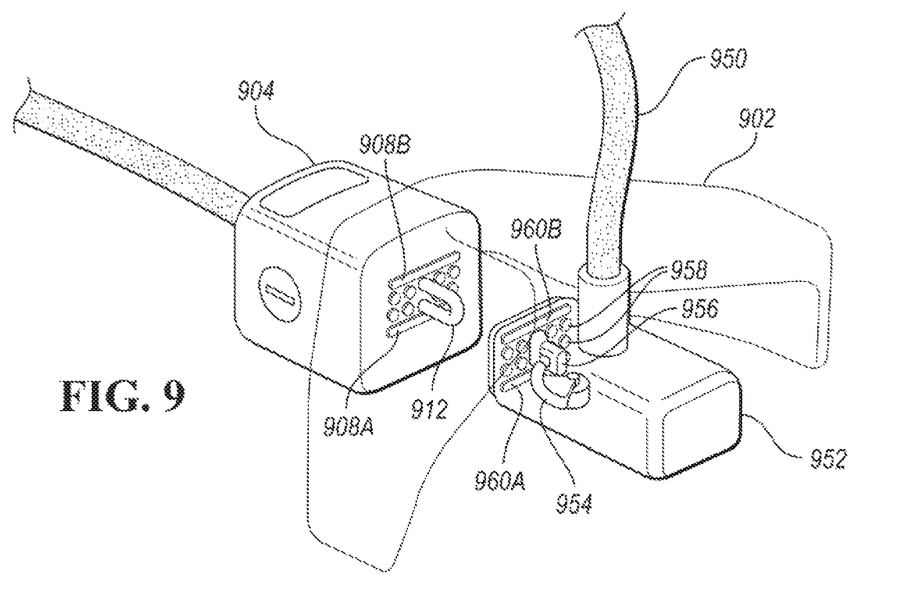
FIG. 9 is a possible configuration for a locking mechanism for the automated charging device in an unlocked state.
Figure 10:
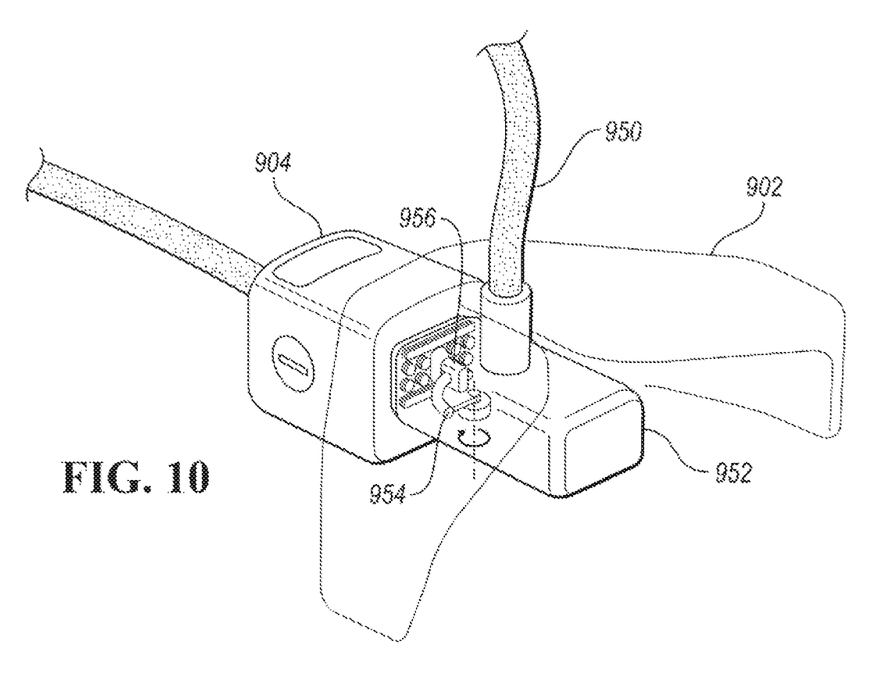
FIG. 10 is a possible configuration for a locking mechanism for the automated charging device in a locked or engaged state.

FIGS. 9 and 10 depict a configuration of the charging system with a locking mechanism that is engaged on the vehicle side. FIG. 9 depicts the ground-based ACD and the vehicle charge plug prior to coupling. FIG. 10 depicts the ground-based ACD and the vehicle charge plug after coupling and in a locked state. The ACD may include an ACD charge plug or connector 904. The ACD charge connector 904 may define a plurality of electrical contacts 910 arranged on a face that is oriented generally perpendicular to a surface (e.g., ground) on which the ACD rests. The face may be a generally vertical plane. The ACD charge connector 904 may include one or more magnetic elements 908 that are configured to attract and retain the vehicle charge connector 952. The magnetic elements 908 may be permanent magnets and/or may be electromagnets driven by an ACD controller. The ACD may include a shroud 902 that is coupled to the ACD charge connector 904. The shroud 902 may be as described previously herein.

In addition, the ACD charge connector 904 may include a hook or loop element 912 that extends from the face of the ACD charge connector 904. The loop element 912 may be positioned in a space between some of the electrical contacts 910.

The vehicle charge connection system may include a vehicle charge plug or connector 952. The vehicle charge connector 952 may include one or more electrical contacts 958. The electrical contacts 958 may be electrically coupled to corresponding conductors of a charge cable 950. The vehicle charge connector 952 may be coupled to the charge cable 950. The one or more electrical contacts 958 may be arranged on a face of the vehicle charge connector 952. The face may be oriented generally perpendicular to a surface on which the vehicle travels. That is, the contacts 958 may be arranged on a vertical plane parallel to the ground surface. The vehicle charge connector 952 may include one or more magnetic elements 960 that are aligned on the face of the vehicle charge connector 952. The magnetic elements 960 may be configured to provide a magnetic force for aligning and securing the connection to the AC charge connector 904 during charging.

The vehicle charge connector 952 may further include a loop channel 956. The loop channel 956 may be configured to receive the loop element 910 when the vehicle charge connector 952 is aligned and proximate to the ACD charge connector 904. The loop channel 956 may define an opening through which the loop element 910 may extend beyond the face and into an interior of the vehicle charge connector 952. The vehicle charge connector 952 may include a lock engagement mechanism 954 that is configured to insert a locking element into the loop element 910. In the depicted example, the lock engagement mechanism 954 may include a curved rod that is configured to be received by the loop element 910. The curved rod may be coupled to a shaft that is configured to rotate to move the curved rod into and out of the loop element 910. The shaft may be driven by an electric motor. In other configurations, a linear actuator or solenoid may drive the curved rod. The electric motor may be controlled by the vehicle controller 230. In an unlocked position, the curved rod is rotated away from the loop channel 956 and the loop element 910. In a locked position, the curved rod is rotated into the loop channel 956 and the loop element 910. In the locked position, the curved rod engages the loop element 910 to prevent separation of the ACD charge connector 904 and the vehicle charge connector 952. The curved rod may be shaped with a varying cross-sectional area such that the ACD charge connector 904 and the vehicle charge connector 952 are drawn closer together as the curved rod is rotated into the locked position.

The vehicle controller 230 may actuate the lock engagement mechanism 954 in response to establishing an electrical connection via the electrical contacts 958. In other configurations, the lock engagement mechanism 954 may be a pin driven by a solenoid. For example, the pin may be aligned with the loop channel 956 and the loop element 910. The solenoid may be actuated to move the pin into the loop element 910 to prevent movement of the loop element 910.

Figure 6:
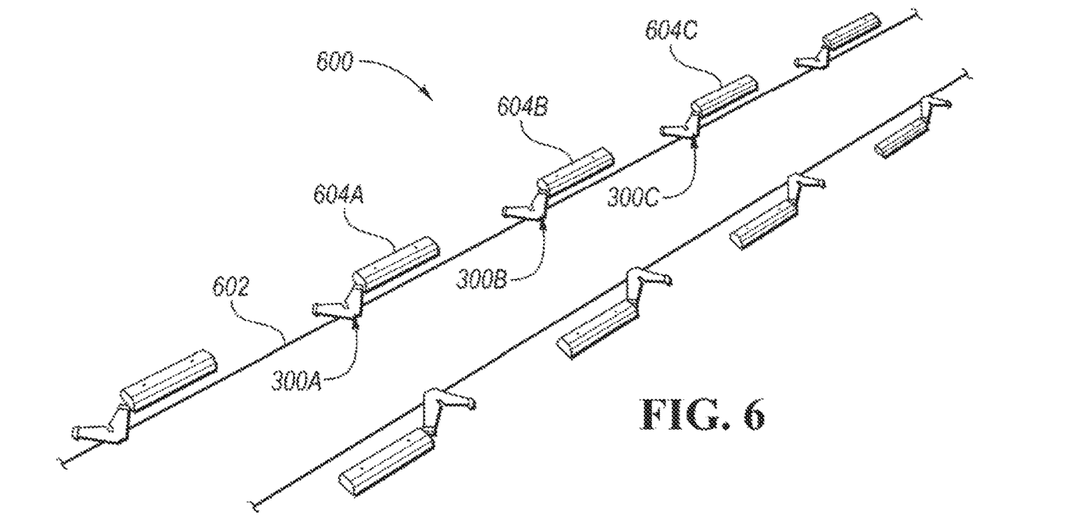
FIG. 6 depicts a possible configuration of a plurality of ground-based automated charging devices deployed in a parking or charging area.

FIG. 6 depicts a possible charging facility 600 that includes a plurality of ACDs 300 that operate as previously described herein. The charging facility 600 may include a plurality of wheel stops 604 associated with each of the ACDs 300. The wheel stops 604 may be configured to stop forward motion of the vehicles to ensure that the vehicle charge connector 216 and the ACD charge connector 304 can properly connect. The design of the ACD 300 allows for multiple stations to be easily installed in a charging facility 600. For example, the ACDs 300 may be placed in each parking spot to facilitate automated charging of vehicles.

Figure 7:
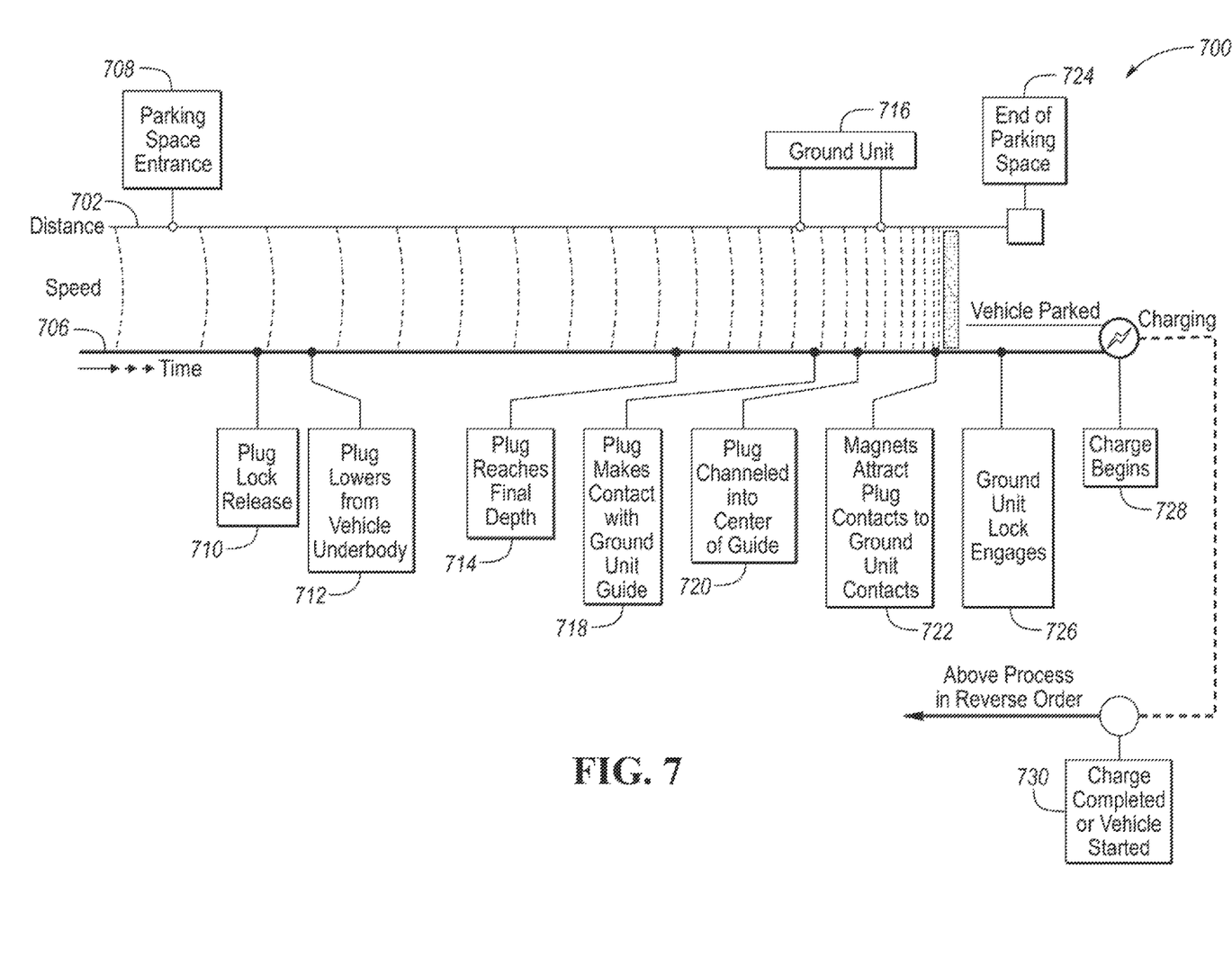
FIG. 7 depicts a diagram showing a possible sequence of operations performed when a vehicle approaches the ground-based automated charging device.

FIG. 7 depicts a possible sequence chart 700 of events or operations that may be performed as the electrified vehicle approaches a charge station. The sequence chart 700 may be indexed by a distance scale 702 and a time scale 706. The distance scale 702 may represent a distance between the vehicle and the charge station. The distance scale 702 may also identify the positions of various elements. The time scale 706 may represent the progression of time. It is expected that speed of the vehicle will decrease when entering the area near the charge station.

A parking space entrance 708 may be defined by a first predetermined distance from the ACD. A position of the ACD may be defined by a predetermined distance range 716. The predetermined distance range 716 may define the distance at which the vehicle charge connector 216 makes contact with the shroud 302 of the ACD. The end of the parking space may be represented by a second predetermined distance 724. The end of the parking space may be a position at which a wheel stop is located or a position at which the front of the vehicle extends.

As the vehicle approaches the ACD, various events may be triggered. The various events may be managed by the vehicle controller 230 and the ACD controller 330 operating individually and/or cooperatively. A plug lock release event 710 may be triggered at a first predetermined time or distance. After entering the parking space, the vehicle controller 230 may issue a command to release the vehicle charge connector 216 from the connector retention frame 205. The vehicle controller may unlock any mechanism that retains or locks the vehicle charge connector 216 in place.

As the vehicle continues to travel toward the ACD, a plug lowering event 712 may be triggered at a second predetermined time or distance. The vehicle charge connector 216 may be lowered from the vehicle underbody. In some configurations, the vehicle controller 230 may operate the electric motor 204 to lower the vehicle charge connector 216. In other configurations, the vehicle charge connector 216 may lower due to the force of gravity.

A plug fully lowered event 714 may occur at a third predetermined time or distance. As the vehicle travels further toward the ACD, the vehicle charge connector 216 may reach a final depth. The final depth may be configured such that the vehicle charge connector 216 is generally horizontally aligned with the ACD charge connector 304.

An initial contact with ground unit event 718 may occur at a fourth predetermined time or distance. As the vehicle continues to travel toward the ACD, the cable protector element 214 may make contact with the ACD shroud 302. As the vehicle continues to travel forward, the cable protector element 214 will slide along the angled surface 314 of the shroud 302 and toward the channel 312.

A plug in center channel event 720 may occur at a fifth predetermined time or distance. As the vehicle continues to travel, the cable protector element 214 may be directed into the channel 312 of the shroud 302. As the vehicle moves forward, the vehicle charge connector 216 travels toward the ACD charge connector 304.

A contact established event 722 may occur at a sixth predetermined time or distance. As the vehicle approaches the end of the parking space, the magnets (218, 308) may attract the vehicle charge connector 216 to the ACD charge connector 304. At this time, the electrical contacts 220 of the vehicle charge connector 216 may be electrically connected to the contacts 310 of the ACD charge connector 304.

A lock engage event 726 may occur at a seventh predetermined time. At a predetermined time after the contact established event 722, the locking pin 402 may be actuated to lock the vehicle charge connector 216 to the ACD. Communication may be established via the contacts 220, 310 between the vehicle controller 230 and the ACD controller 330.

A charge event may be triggered at an eighth predetermined time. At this time, charging of the traction battery 124 may take place according to the established charging procedures and protocols. The vehicle 112 and EVSE 138 may exchange power and signals to manage the charging operation.

A charge termination event 730 may occur when charging is completed or the vehicle 112 is started. Charge termination may be detected by the initiation of a drive cycle (e.g., ignition switch placed in RUN position). As the vehicle 112 leaves the ACD, the above described process may be reversed.

Figure 8A:
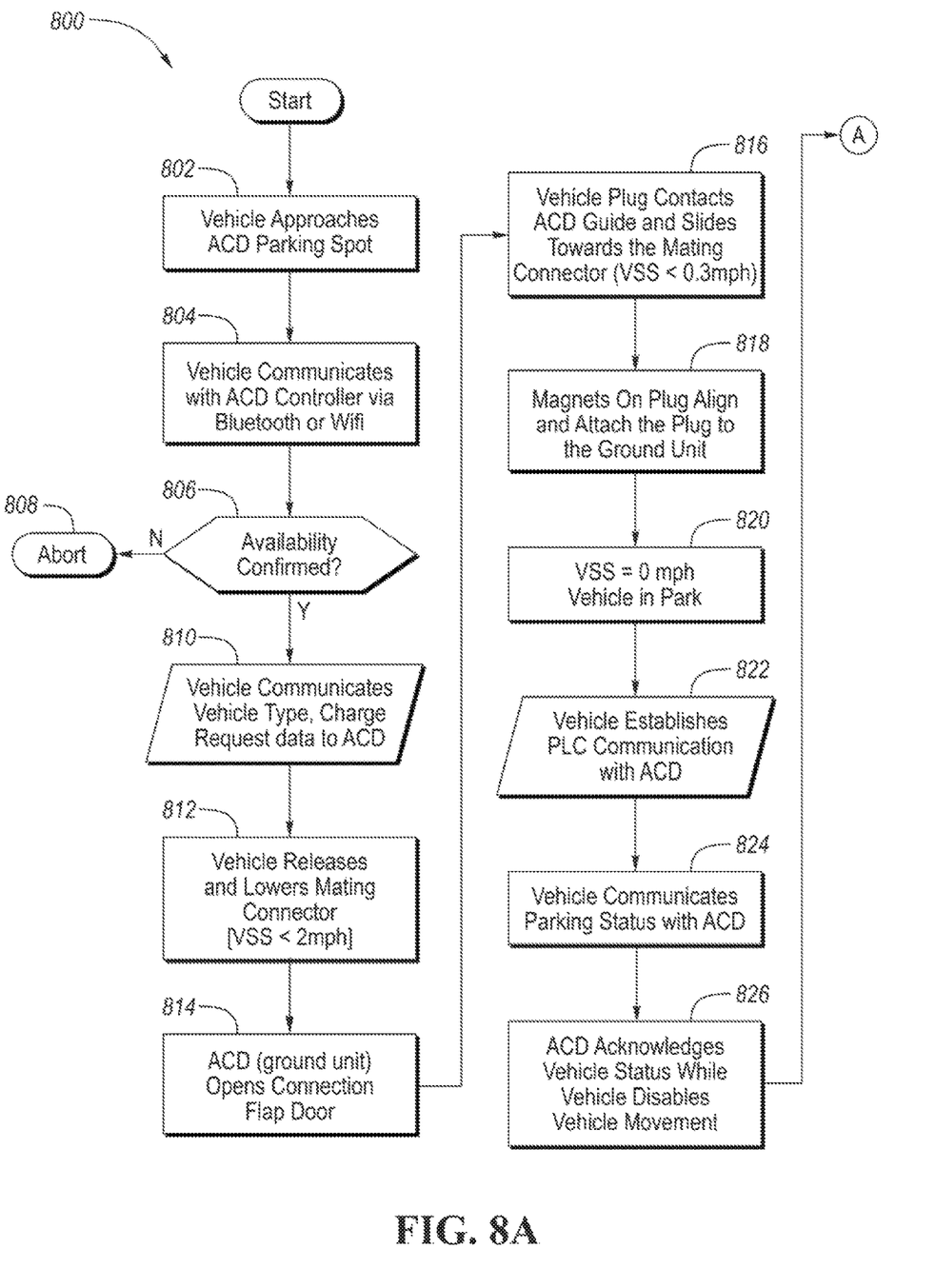
FIGS. 8A and 8B depict a flowchart for a possible sequence of operations for charging a vehicle using the vehicle charge connector and the ground-based automated charging device.
Figure 8B:
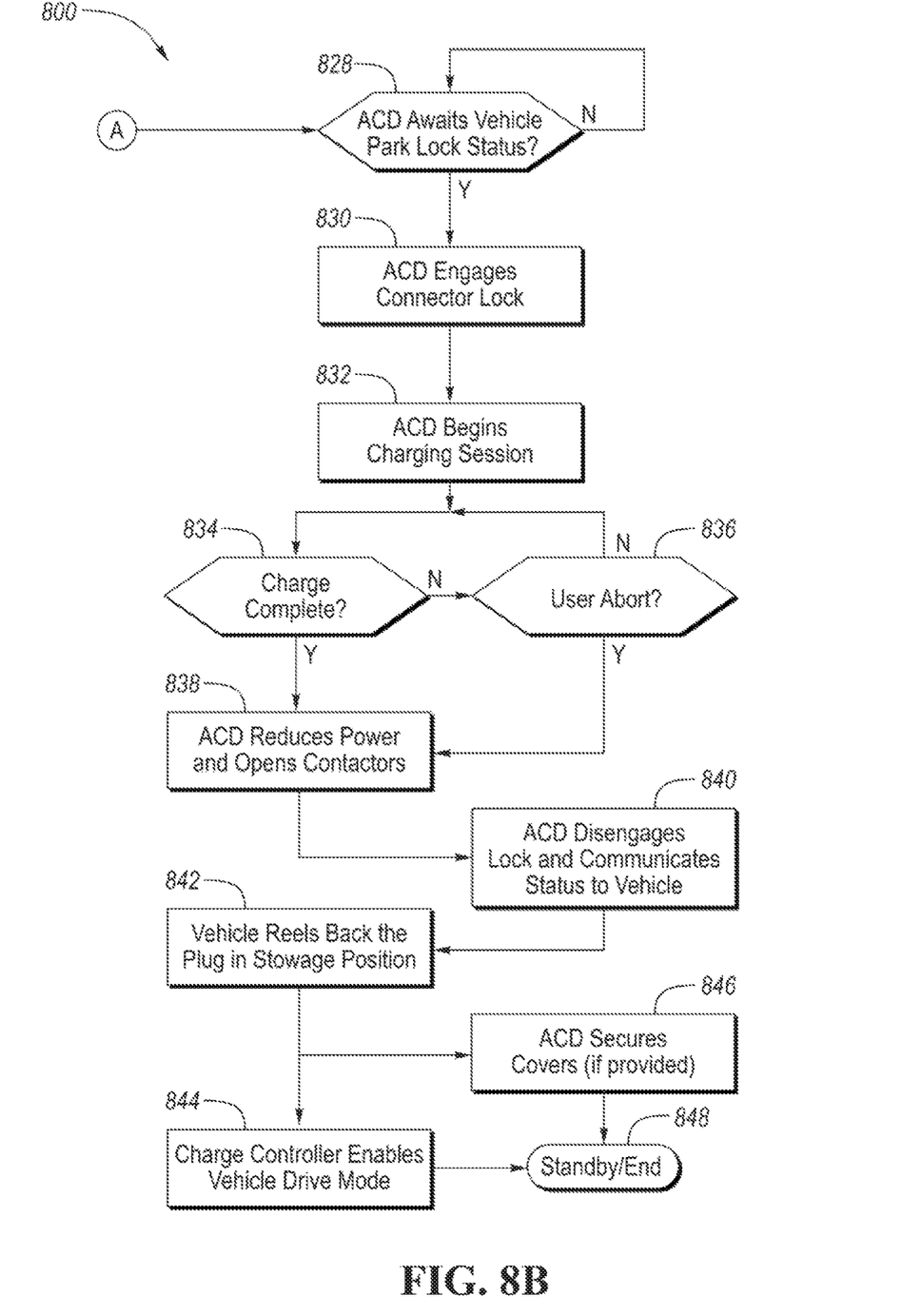

FIGS. 8A and 8B depict a flowchart 800 of a possible sequence of operations for implementing the vehicle/Automated Charging Device (ACD) interaction. The operations may be implemented in part by the vehicle controller 230 and/or the ACD controller 330. At operation 802, the vehicle 112 approaches an ACD-equipped parking spot. The approach may be done manually by the operator or may be automated by an autonomous driving system. At operation 804, the vehicle controller 230 communicates with the ACD controller 330 via a wireless communication link. For example, the wireless communication link may be a Bluetooth or wifi link. The vehicle controller 230 and the ACD controller 330 may exchange charging related information at this time. Communication data may include an ACD availability status to confirm the operational status of the ACD.

At operation 806, the availability of the ACD may be evaluated. If the ACD is not available or operational, operation 808 may be performed to abort the charging operation. Aborting the charging operation may include providing a notification to the vehicle operator that the charging process cannot be performed at the selected ACD. If the ACD availability is confirmed, operation 810 may be performed.

At operation 810, the vehicle controller 230 may communicate information to the ACD controller 330. For example, the vehicle controller 230 may communicate a vehicle type and charging request data to the ACD controller 330. At operation 812, the vehicle controller 230 may release and lower the vehicle charge connector 216. The release of the vehicle charge connector 216 may be conditioned on the vehicle speed being below a speed threshold (e.g., 2 mph). The vehicle controller 230 may operate the electric motor 204 to lower the vehicle charge connector 216.

At operation 814, the ACD controller 330 may open an optional panel to expose the contacts of the ACD charge connector 304. At operation 816, the vehicle charge connector 216 contacts the shroud 302 of the ACD and moves as guided by the shroud 302 toward the ACD charge connector 304. The vehicle controller 230 may check that the vehicle speed is less than a low-speed threshold (e.g., 0.3 mph). At operation 818, magnets 218, 308 on the connectors may attract the vehicle charge connector 216 to the ACD charge connector 304. In configurations, in which the magnets 218, 308 are electromagnets, the corresponding controller may energize the electromagnets. At this time, the electrical contacts 220 of the vehicle charge connector 216 may be electrically connected to the contacts 310 of the ACD charge connector 304. At operation 820, the vehicle controller 230 may confirm that the vehicle is in a park mode and that the vehicle speed is zero. The vehicle controller 230 may confirm that the vehicle is in the park mode upon detecting a shift of a gear selector to the PARK position.

At operation 822, the vehicle controller 230 may establish communication through the vehicle charge connector 216 with the ACD controller 330. At operation 824, the vehicle controller 230 may communicate the parking status to the ACD controller 330. At operation 826, the ACD controller 330 may acknowledge the vehicle state and the vehicle controller 230 may disable vehicle movement. For example, vehicle movement may be disabled by application of a parking brake and/or disabling of a propulsion system or powertrain. At operation 828, the ACD controller 330 may check the vehicle park lock status. If the vehicle controller 230 has correctly applied the park lock, operation 830 may be performed. The park lock status may be confirmed based on the parking brake being in the on or activated position.

At operation 830, the ACD controller 330 may activate the actuator 404 to engage the locking pin 402. For example, the ACD controller 330 may actuate the actuator 404 to drive the locking pin 402 into the channel 312. At operation 832, the charging session may be initiated. For example, the charging session may be performed as defined by the SAE J1772 standard. At operation 834, a charge complete check may be performed. Charging may be completed if a state of charge of the traction battery 124 exceeds a predetermined threshold indicative of a preferred charge level. If charging is not completed, operation 836 may be performed to check for a user abort condition. Charging may be abort manually by the operator. In some cases, charging may be aborted by placing the vehicle in a run or drive mode. If the operator has aborted the charging session, operation 838 may be performed. If the operator has not aborted the charging session, the vehicle will continue charging. If charging is completed at operation 834, operation 838 may be performed.

At operation 838, the ACD controller 330 may reduce power and open any contactors to disconnect power from the ACD charge connector 304. At operation 840, the ACD controller 330 may disengage the locking pin 402 by operating the actuator 404 and communicate the status to the vehicle controller 330. At operation 842, the vehicle controller 230 may perform operations to reel the vehicle charge connector 216 back to the storage position. For example, the vehicle controller 330 may operate the electric motor 204 to wind the charge cable 208 on the cable spool 202. At operation 846, the ACD controller 330 may secure any covers and enter a standby mode at operation 848. At operation 844, the vehicle controller 230 may enable a vehicle drive mode and enter a standby mode at operation 848. At this time, the vehicle may drive away from the ACD-equipped parking spot.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle charging system comprising:
   a charge connector coupled to a power supply and having contacts arranged on a face that is oriented generally perpendicular to a surface on which the vehicle charging system rests;
   a shroud coupled to the charge connector, and including a surface defining a channel leading from the charge connector to a pair of angled surfaces continuous with the channel that flare out from the channel such that the channel and angled surfaces have a Y-shape, wherein the angled surfaces are configured to guide an element of a charge plug that is lowered from a vehicle and moving toward the charge connector into the channel; and
   a locking pin coupled to an actuator and configured to selectively extend into the channel and limit movement of the charge plug.

2. The vehicle charging system of claim 1, wherein the actuator is a solenoid.

3. The vehicle charging system of claim 1, wherein the shroud is further configured with an upper surface that is shaped to slope away from the channel and the charge connector to direct liquid away from the channel.

4. The vehicle charging system of claim 1, wherein the charge connector further includes one or more magnetic elements to attract the charge plug.

5. The vehicle charging system of claim 1, wherein the shroud includes integrated supports configured to support the shroud on the surface and defines open sides to prevent debris accumulation under the shroud.

6. The vehicle charging system of claim 1 further including flexible feet coupled to the shroud and configured to support the shroud on the surface.

7. The vehicle charging system of claim 1 further comprising a heating element coupled to the shroud and configured to prevent accumulation of ice proximate the charge connector.

8. The vehicle charging system of claim 1 further comprising a charge status indicator that is coupled to a charge cable coupled to the charge connector and configured to convey status of the vehicle charging system.

9. The vehicle charging system of claim 8, wherein the charge status indicator further includes a plurality of light elements for conveying a state of charge of a vehicle battery during charging.

10. The vehicle charging system of claim 8, wherein the charge status indicator further includes a display element configured to display a time to full charge.

11. The vehicle charging system of claim 8, wherein the charge status indicator includes a multicolor lighting element to convey the status.

* * * * *